United States Patent
Takaishi et al.

(10) Patent No.: US 9,467,578 B2
(45) Date of Patent: Oct. 11, 2016

(54) CORRECTING GRADATION VALUE TO APPOXIMATE AN OUTPUT CHARACTERISTIC TO TARGET CHARACTERISTIC UPDATED BASED ON CORRECTED HIGH DENSITY REGION TARGET DENSITY

(71) Applicant: FUJI XEROX CO., LTD., Tokyo (JP)

(72) Inventors: Shinya Takaishi, Kanagawa (JP); Kazuyuki Takahashi, Kanagawa (JP); Yosuke Tashiro, Kanagawa (JP); Kaori Tominaga, Kanagawa (JP)

(73) Assignee: FUJI XEROX CO., LTD., Tokyo (JP)

( * ) Notice: Subject to any disclaimer, the term of this patent is extended or adjusted under 35 U.S.C. 154(b) by 0 days.

(21) Appl. No.: 14/753,454

(22) Filed: Jun. 29, 2015

(65) Prior Publication Data
US 2016/0246233 A1   Aug. 25, 2016

(30) Foreign Application Priority Data
Feb. 24, 2015   (JP) .................... 2015-034195

(51) Int. Cl.
*G06K 15/02* (2006.01)
*H04N 1/407* (2006.01)
*H04N 1/60* (2006.01)
*H04N 1/00* (2006.01)
*G03G 15/00* (2006.01)
*G06K 15/14* (2006.01)
*H04N 1/29* (2006.01)

(52) U.S. Cl.
CPC ...... *H04N 1/00068* (2013.01); *G03G 15/5062* (2013.01); *G06K 15/027* (2013.01); *H04N 1/00015* (2013.01); *H04N 1/00023* (2013.01); *H04N 1/00031* (2013.01); *H04N 1/00034* (2013.01); *H04N 1/00045* (2013.01); *H04N 1/00082* (2013.01); *H04N 1/407* (2013.01); *H04N 1/4078* (2013.01); *H04N 1/6027* (2013.01); *H04N 1/6033* (2013.01); *G06K 15/14* (2013.01); *H04N 1/29* (2013.01)

(58) Field of Classification Search
None
See application file for complete search history.

(56) References Cited

U.S. PATENT DOCUMENTS

| | | | | |
|---|---|---|---|---|
| 6,714,673 B1 * | 3/2004 | Ohta | ............... | G06K 15/02 358/1.9 |
| 6,804,025 B1 * | 10/2004 | Ueda | ............... | H04N 1/6033 358/1.9 |
| 2007/0121130 A1 * | 5/2007 | Yoshida | ............... | B41J 2/04551 358/1.9 |

FOREIGN PATENT DOCUMENTS

| | | |
|---|---|---|
| JP | 2005109975 A | 4/2005 |
| JP | 2012080335 A | 4/2012 |

*Primary Examiner* — Scott A Rogers
(74) *Attorney, Agent, or Firm* — Oliff PLC

(57) ABSTRACT

A correcting apparatus includes a first acquiring unit that acquires a target characteristic expressing a correspondence relationship between a gradation value and a target density of an image to be output from an output apparatus in accordance with the gradation value; a second acquiring unit that acquires an output characteristic expressing a correspondence relationship between a gradation value and a measured density of the image output from the output apparatus in accordance with the gradation value; an updating unit that updates the target characteristic by correcting the target density corresponding to a high density region including a maximum target density value when a difference between a maximum measured density value and the maximum target density value is larger than a predetermined value; and a correcting unit that corrects the gradation value so as to approximate the output characteristic to the updated target characteristic.

6 Claims, 11 Drawing Sheets

CORRECTING GRADATION VALUE TO APPOXIMATE AN OUTPUT CHARACTERISTIC TO TARGET CHARACTERISTIC UPDATED BASED ON CORRECTED HIGH DENSITY REGION TARGET DENSITY

CROSS-REFERENCE TO RELATED APPLICATIONS

This application is based on and claims priority under 35 USC 119 from Japanese Patent Application No. 2015-034195 filed Feb. 24, 2015.

BACKGROUND

Technical Field

The present invention relates to correcting apparatuses, output apparatuses, and correcting methods.

SUMMARY

According to an aspect of the invention, there is provided a correcting apparatus including a first acquiring unit, a second acquiring unit, an updating unit, and a correcting unit. The first acquiring unit acquires a target characteristic expressing a correspondence relationship between a gradation value and a target density of an image to be output from an output apparatus in accordance with the gradation value. The second acquiring unit acquires an output characteristic expressing a correspondence relationship between a gradation value and a measured density of the image output from the output apparatus in accordance with the gradation value. The updating unit updates the target characteristic by correcting the target density corresponding to a high density region including a maximum value of the target density when a difference between a maximum value of the measured density and the maximum value of the target density is larger than a predetermined value. The correcting unit corrects the gradation value so as to approximate the output characteristic acquired by the second acquiring unit to the target characteristic updated by the updating unit.

BRIEF DESCRIPTION OF THE DRAWINGS

An exemplary embodiment of the present invention will be described in detail based on the following figures, wherein.

DETAILED DESCRIPTION

1. Exemplary Embodiment

1.1. Overall Configuration of Image Forming System

Figure 1:
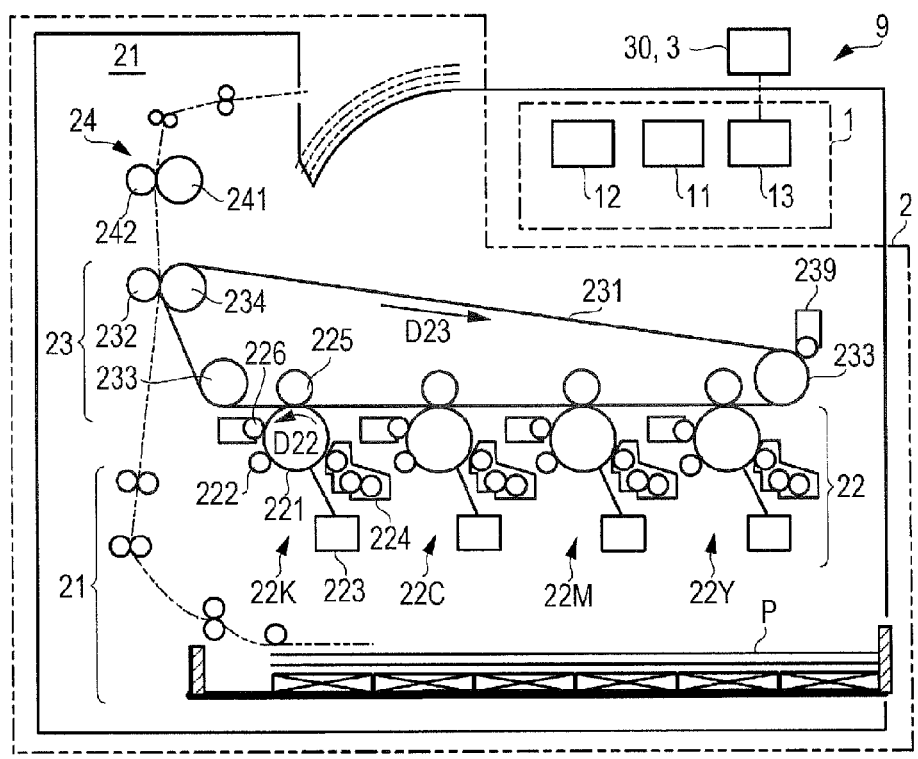
FIG. 1 illustrates the overall configuration of an image forming system according to an exemplary embodiment.

FIG. 1 illustrates the overall configuration of an image forming system 9 according to an exemplary embodiment. As shown in FIG. 1, the image forming system 9 includes a correcting apparatus 1 and an output apparatus 2. The image forming system 9 may further include a measuring apparatus 3 that measures an image output from the output apparatus 2.

The correcting apparatus 1 has a controller 11, a storage unit 12, and an operable unit 13, and also has, for example, a signal line for transmitting a control signal to the output apparatus 2. The output apparatus 2 has a transport unit 21, developing units 22Y, 22M, 22C, and 22K, a transfer unit 23, and a heating unit 24, and also has an interface that accepts the control signal transmitted from the correcting apparatus 1.

Reference characters Y, M, C, and K refer to components corresponding to yellow, magenta, cyan, and black toners, respectively. The developing units 22Y, 22M, 22C, and 22K use different toners but are substantially similar in configuration. If the developing units 22Y, 22M, 22C, and 22K are not to be particularly distinguished from one another in the following description, the developing units will be simply referred to as "developing units 22" by omitting the alphabetical suffix characters indicating the toner colors.

The controller 11 has a central processing unit (CPU), a read-only memory (ROM), and a random access memory (RAM). The CPU reads and executes a computer program (which will simply be referred to as "program" hereinafter) stored in the ROM or the storage unit 12 so as to control each component of the image forming system 9.

The operable unit 13 includes an operator, such as an operable button, for inputting various kinds of commands, accepts user's operation, and supplies a signal according to the contents of user's operation to the controller 11. Furthermore, the operable unit 13 has an interface that accepts data supplied from, for example, a measuring unit 30, which is as an example of the measuring apparatus 3.

The storage unit 12 is a large-volume storage unit, such as a hard disk drive, and stores a program to be read by the CPU of the controller 11. Furthermore, the storage unit 12 stores a target characteristic 121, color chart data 122, image data 123, and a color conversion profile group 124 shown in FIG. 2. The detailed contents of these types of data stored in the storage unit 12 will be described later.

The transport unit 21 has a container and a transport roller. The container accommodates therein sheets P as media cut to a predetermined size. The sheets P accommodated in the container are fetched one-by-one by the transport roller in response to a command from the controller 11, and each sheet P is transported to the transfer unit 23 via a sheet transport path. The medium used is not limited to paper and may alternatively be, for example, a resin sheet. In other words, the medium may be of any type so long as an image is recordable on a surface thereof.

Each developing unit 22 includes a photoconductor drum 221, a charging device 222, an exposure device 223, a developing device 224, a first-transfer roller 225, and a drum cleaner 226. The photoconductor drum 221 is an image bearing member having a charge generating layer and a charge transport layer and is rotated in a direction of an arrow D22 by a driver (not shown). The charging device 222 electrostatically charges the surface of the photoconductor drum 221. The exposure device 223 includes a laser emitting source (not shown) and a polygonal mirror (not shown). Under the control of the controller 11, the exposure device 223 radiates laser light according to image-indicating data toward the photoconductor drum 221 that has been electrostatically charged by the charging device 222. Thus, a latent image is formed on the photoconductor drum 221.

Although the aforementioned image-indicating data is the color chart data 122 or the image data 123 stored in the storage unit 12, the image-indicating data may alternatively be data acquired by the controller 11 from an external device via a communication unit (not shown). The external device is, for example, a reading device that reads an original image or a storage device that stores image-indicating data.

The developing device 224 accommodates a two-component developer containing any one of the Y, M, C, and K toners and a magnetic carrier, such as ferrite powder. The tips of a magnetic brush formed in the developing device 224 come into contact with the surface of the photoconductor drum 221, so that the toner becomes adhered to an area on the surface of the photoconductor drum 221 exposed to light from the exposure device 223, that is, an image area of the electrostatic latent image, whereby an image is formed (developed) on the photoconductor drum 221.

The first-transfer roller 225 generates a predetermined potential difference at a position where an intermediate transfer belt 231 of the transfer unit 23 faces the photoconductor drum 221, and transfers the image onto the intermediate transfer belt 231 in accordance with this potential difference. The drum cleaner 226 removes non-transferred residual toner from the surface of the photoconductor drum 221 after the image transfer process and removes the electrostatic charge from the surface of the photoconductor drum 221.

The transfer unit 23 has the intermediate transfer belt 231, a second-transfer roller 232, a belt transport roller 233, a backup roller 234, and a belt cleaner 239. The transfer unit 23 is configured to transfer the image formed by the developing unit 22 onto the type of sheet P set in accordance with user's operation.

The intermediate transfer belt 231 is an endless belt member, and the belt transport roller 233 and the backup roller 234 support this intermediate transfer belt 231. At least one of the belt transport roller 233 and the backup roller 234 is equipped with a driver (not shown) and moves the intermediate transfer belt 231 in a direction of an arrow D23. Thus, an image on the intermediate transfer belt 231 is moved to a region nipped between the second-transfer roller 232 and the backup roller 234.

In accordance with a potential difference between the second-transfer roller 232 and the intermediate transfer belt 231, the second-transfer roller 232 transfers the image on the intermediate transfer belt 231 onto the sheet P transported from the transport unit 21. The belt cleaner 239 removes non-transferred residual toner from the surface of the intermediate transfer belt 231. The transfer unit 23 or the transport unit 21 transports the sheet P having the image transferred thereon to the heating unit 24.

The heating unit 24 heats the image transferred on the sheet P so as to fix the image thereon. The heating unit 24 has a heating roller 241 and a pressing roller 242. The pressing roller 242 is rotated by a driver (rotating mechanism) (not shown) while pressing the sheet P transported by the transport unit 21 against the heating roller 241, which heats the sheet P, so as to assist in the heating of the sheet P by the heating roller 241.

1.2. Functional Configuration of Correcting Apparatus

Figure 2:
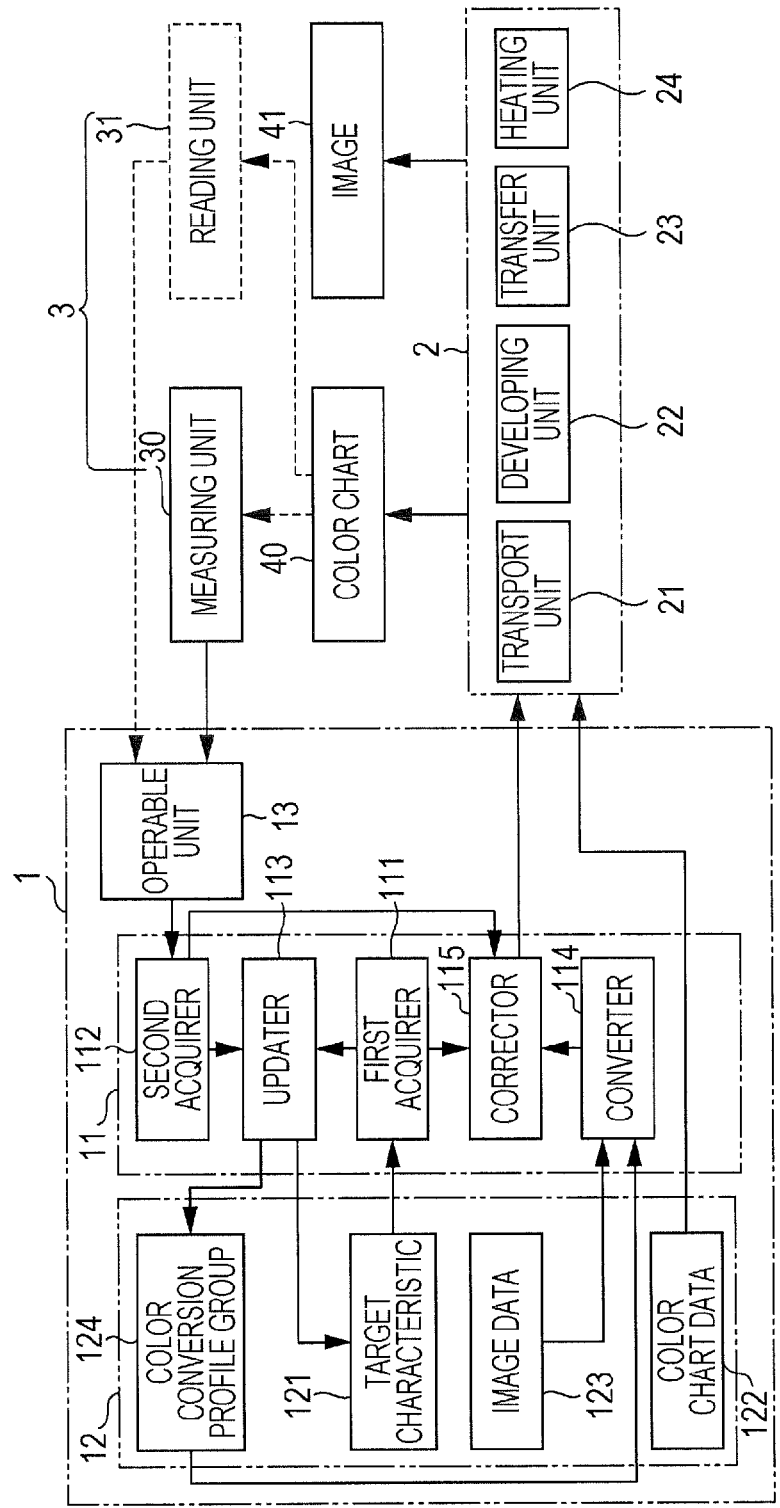
FIG. 2 illustrates a functional configuration of a correcting apparatus in the image forming system.

FIG. 2 illustrates a functional configuration of the correcting apparatus 1 in the image forming system 9. The controller 11 of the correcting apparatus 1 executes the program stored in the storage unit 12 so as to function as a first acquirer 111, a second acquirer 112, an updater 113, a converter 114, and a corrector 115.

The first acquirer 111 acquires the target characteristic 121 from the storage unit 12. The target characteristic 121 is information expressing the correspondence relationship between a gradation value and the density of an image to be output from the output apparatus 2 in accordance with that gradation value.

Figure 3:
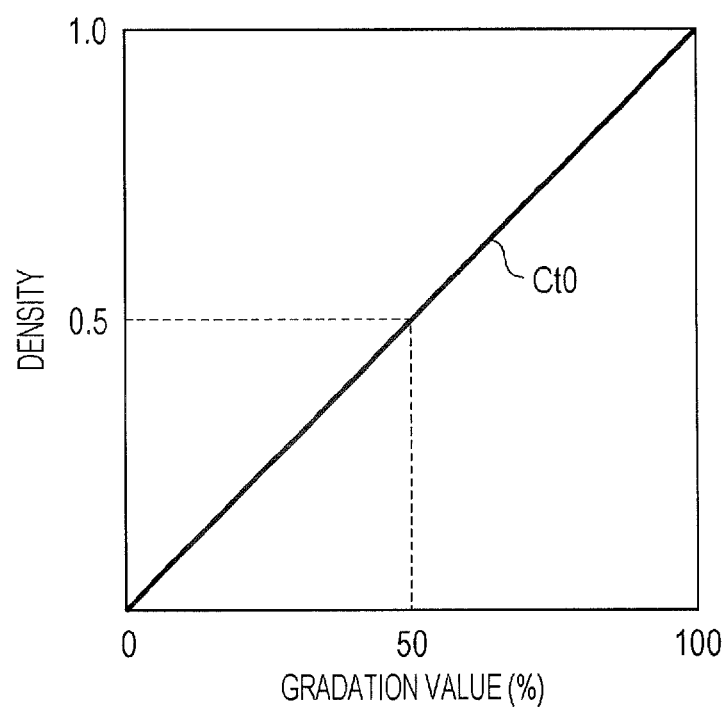
FIG. 3 illustrates a target characteristic.

FIG. 3 illustrates the target characteristic 121. The target characteristic 121 is set in advance for each of the yellow, magenta, cyan, and black colors.

In FIG. 3, the abscissa axis indicates a gradation value, whereas the ordinate axis indicates a density. A gradation value is a numerical value of a signal that expresses the gradation level of each primary color in image data indicating an image. In this example, a gradation value is expressed in a range between 0% and 100%. A density is the denseness of an image formed on a recording medium and is expressed by, for example, toner weight per unit area. Since a density may be a relative numerical value with reference to a predetermined density, the unit of density will be omitted in the following description.

The target characteristic 121 in FIG. 3 is expressed by a line Ct0 indicating a linear function. In this target characteristic 121, when the gradation value is 100%, a target density is 1.0. When the gradation value is 50%, a target density is 0.5. When the gradation value is 0%, a target density is 0.

The color chart data 122 stored in the storage unit 12 is used for commanding the output apparatus 2 to form a color chart 40 having a matrix of yellow, magenta, cyan, and black color samples onto a recording medium. The controller 11 reads the color chart data 122 from the storage unit 12 and causes the output apparatus 2 to output the color chart 40.

A user uses the measuring device 3 to measure the density of each color sample formed on the color chart 40. By using the measuring unit 30 as the measuring device 3, the user may apply a sensor to each color sample formed on the color chart 40 so as measure the density of the color indicated by the color sample. Alternatively, by using a reading unit 31, such as a scanner, the user may scan the color chart 40 and output data in which the read positions and the color densities are associated with each other.

The user associates the data indicating the density of each color sample on the color chart 40 measured by the measuring unit 30 with the gradation value of the color sample and inputs the data to the operable unit 13. The second acquirer 112 receives this data so as to acquire an output characteristic expressing the correspondence relationship between the gradation value and the measured density of the image output from the output apparatus 2 in accordance with the gradation value.

The updater 113 updates the target characteristic 121 acquired by the first acquirer 111 based on the output characteristic acquired by the second acquirer 112. Furthermore, the updater 113 selects a profile to be used by the converter 114 from the color conversion profile group 124 in accordance with the update contents of the target characteristic 121.

The converter 114 converts the gradation value of each color indicated by the image data 123 based on the color conversion profile group 124.

Figure 4:
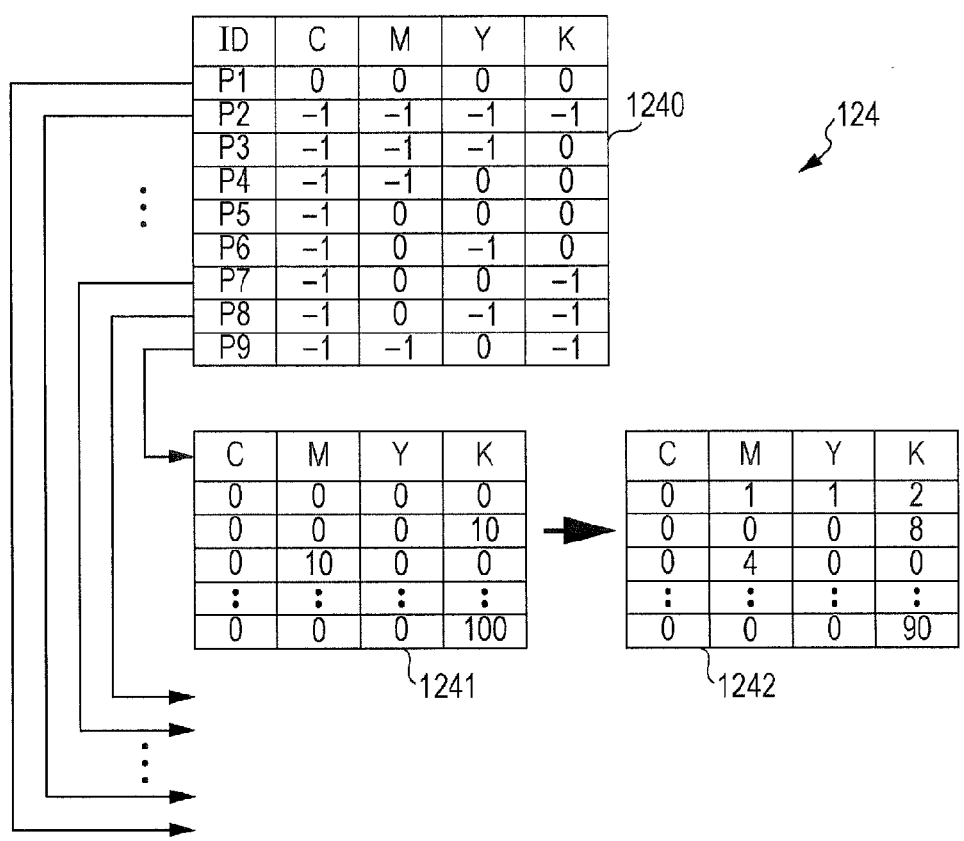
FIG. 4 illustrates a color conversion profile group.

FIG. 4 illustrates the color conversion profile group 124. The color conversion profile group 124 is data used for converting a color space of the image data 123 into a color space having colors of colorants as components to be used by the output apparatus 2 for forming an image. The color conversion profile group 124 has a profile ID list 1240, pre-conversion data 1241, and post-conversion data 1242.

The pre-conversion data 1241 is obtained by quantizing the color space in the image data 123 and is a data group indicating multiple representative points in that color space. The post-conversion data 1242 is a data group indicating multiple points obtained by converting the points in the pre-conversion data 1241 into a color space of the output apparatus 2, and a single profile is defined for each set of the pre-conversion data 1241 and the post-conversion data 1242.

The profile ID list 1240 has identification information (profile IDs) for identifying each of the profiles. Furthermore, in the profile ID list 1240, a combination of the update statuses of the respective colors is associated with each of these profile IDs. An update status "0" indicates that the target characteristic 121 is maintained without being updated. An update status "−1" indicates that the target density of the target characteristic 121 has been updated to a lower value.

For example, in the profile ID list 1240 of the color conversion profile group 124 shown in FIG. 4, update statuses associated with a profile ID "P9" are "0" for yellow (Y), "−1" for magenta (M), "−1" for cyan (C), and "−1" for black (K). In other words, the update statuses associated with the profile ID "P9" indicate that the target characteristic 121 is maintained only for the yellow color and the target density has been updated to a lower value for each of the remaining colors.

The updater 113 selects one of the profile IDs included in the profile ID list 1240 in accordance with the combination of the update statuses of the respective colors so as to determine a profile to be used by the converter 114. The profile ID list 1240 may alternatively include an update status that indicates that the target density of the target characteristic 121 has been updated to a higher value.

The converter 114 acquires a profile indicated by the selected profile ID from the color conversion profile group 124 and converts a point included in the pre-conversion data 1241 of that profile into a point in the corresponding post-conversion data 1242. With regard to a point not included in the pre-conversion data 1241, the converter 114 performs the conversion by interpolating that point by using the multiple points included in the pre-conversion data 1241.

The corrector 115 corrects the gradation value of the image data 123 converted by the converter 114 so as to approximate the output characteristic acquired by the second acquirer 112 to the target characteristic 121 updated by the updater 113.

The output apparatus 2 outputs an image 41 based on the gradation value of the image data 123 corrected by the corrector 115.

1.3. Operation of Correcting Apparatus

Figure 5:
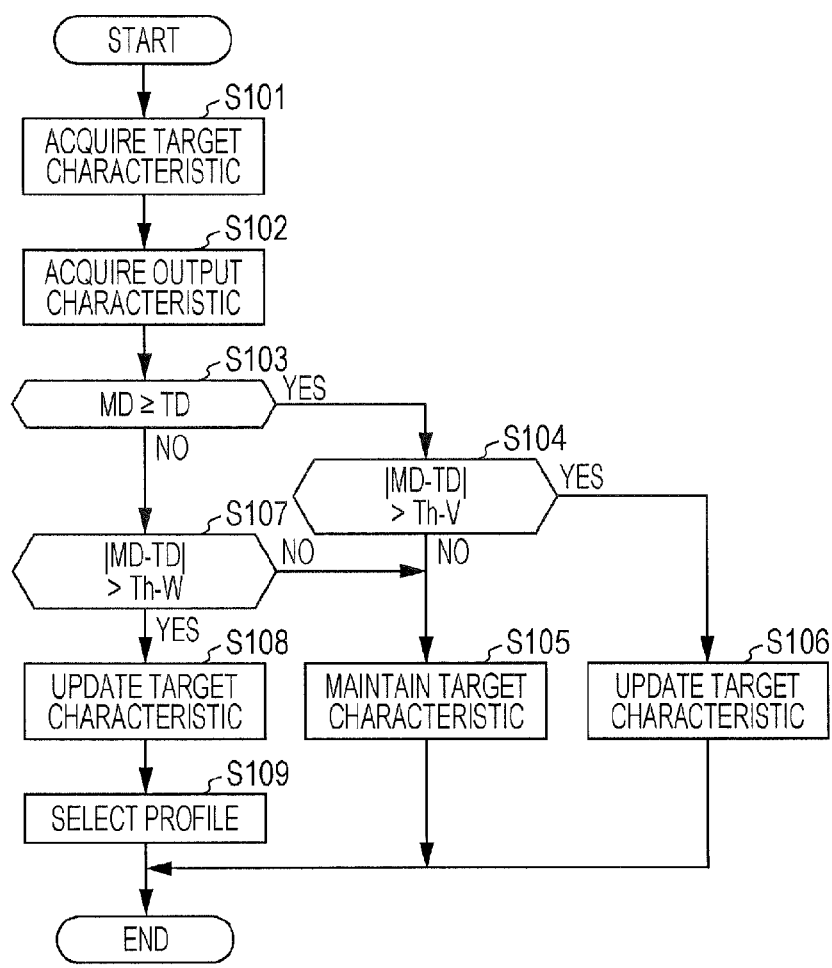
FIG. 5 is a flowchart illustrating the flow of an operation performed by the correcting apparatus.

FIG. 5 is a flowchart illustrating the flow of an operation performed by the correcting apparatus 1. In step S101, the controller 11 of the correcting apparatus 1 acquires the target characteristic 121 from the storage unit 12. Then, the user uses the measuring unit 30 to measure the color chart 40, and the controller 11 acquires the output characteristic input by the user via the operable unit 13 in step S102.

Subsequently, in step S103, the controller 11 compares a maximum target density TD, which is the maximum target density value in the target characteristic 121, with a maximum measured density MD, which is the maximum measured density value in the output characteristic acquired as a result of the measurement.

If the maximum measured density MD is higher than or equal to the maximum target density TD (YES in step S103), the controller 11 determines in step S104 whether or not an absolute value of a difference between the maximum measured density MD and the maximum target density TD exceeds a first threshold value Th-V. This first threshold value Th-V indicates the limit at which halftone dots in a high density image are recognizable by humans.

A case where the maximum measured density MD is higher than or equal to the maximum target density TD and the absolute value of the difference between the maximum measured density MD and the maximum target density TD exceeds the first threshold value Th-V corresponds to a case where the maximum measured density MD (the maximum measured density value) is higher than the maximum target density TD (the maximum target density value) beyond the first threshold value Th-V.

If the controller 11 determines that the absolute value of the difference between the maximum measured density MD and the maximum target density TD does not exceed the first threshold value Th-V (NO in step S104), the controller 11 maintains the target characteristic 121 in step S105 and ends the process.

On the other hand, if the controller 11 determines that the absolute value of the difference between the maximum measured density MD and the maximum target density TD exceeds the first threshold value Th-V (YES in step S104), the controller 11 updates the target characteristic 121 in step S106 so that the absolute value of the difference between the maximum measured density MD and the maximum target density TD becomes equal to the first threshold value Th-V.

Figure 6A:
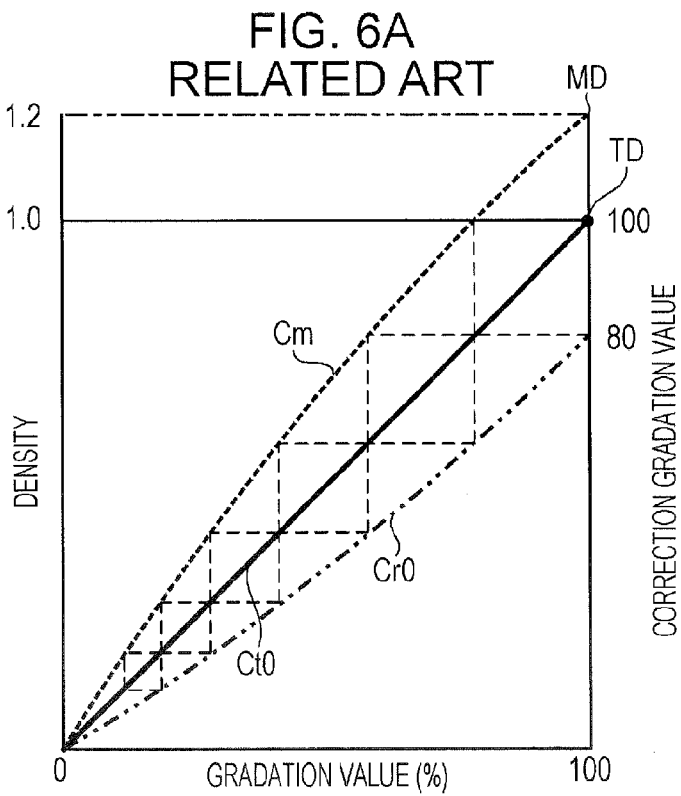
FIGS. 6A and 6B illustrate non-updated target characteristics in the related art.
Figure 6B:
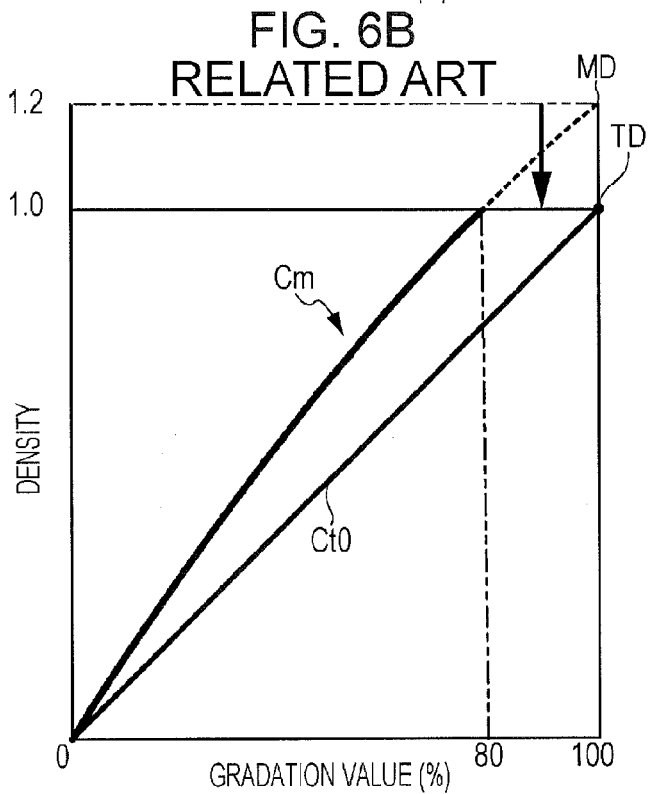
Figure 7:
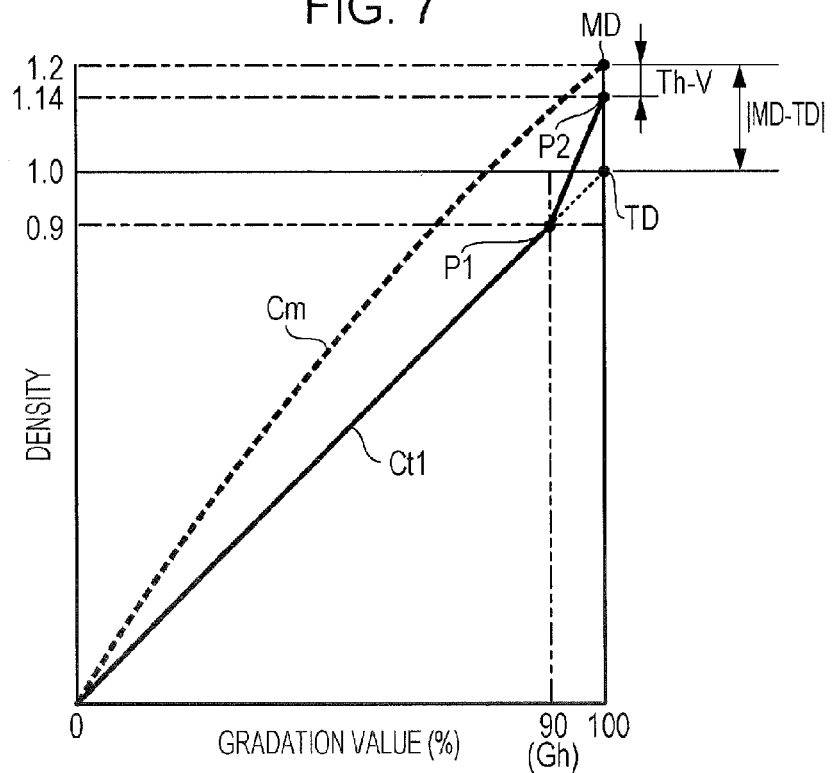
FIG. 7 is a diagram for explaining a first threshold value.

FIGS. 6A and 6B illustrate non-updated target characteristics in the related art. FIG. 7 is a diagram for explaining the first threshold value Th-V. A curve line Cm in each of FIGS. 6A and 6B and FIG. 7 indicates the output characteristic acquired from the measuring device 3, and the density corresponding to the gradation value of 100% is the maximum measured density MD of 1.2. As shown in FIGS. 6A and 6B and FIG. 7, the following description relates to a case where the maximum target density TD is 1.0 and the maximum measured density MD is 1.2.

When expressing the maximum measured density MD of 1.2, the output apparatus 2 performs so-called solid printing in which a predetermined range of a recording medium is entirely smothered with toner. When expressing the gradation from 0 to 1.2, the output apparatus 2 performs so-called mesh printing in which halftone dots formed by toner are arranged at predetermined intervals in a predetermined range of a recording medium. The gradation in a meshed image is recognizable by humans in accordance with the ratio of the gross area of the halftone dots to the entire area. However, when outputting, for example, a character formed of a line with a size similar to that of halftone dots, the character may fade and be unrecognizable, or the halftone dots may be conspicuously recognized, sometimes causing image disturbance.

The ordinate axis in FIG. 6A indicates a density in addition to a corrected gradation value (correction gradation value). For example, in the related art, regardless of how much the maximum measured density MD in the output characteristic exceeds the maximum target density TD, the target characteristic indicated by the line Ct0 in FIG. 6A is not updated. A line Cr0 shown in FIG. 6A indicates an example of a correction characteristic in the related art. When the gradation value is corrected in accordance with this correction characteristic, the original gradation value of 100% is corrected to a correction gradation value at which the density becomes 1.0 in the output characteristic, so as to become, for example, 80% as shown in FIG. 6B. In this case, since the correction gradation value commanded to the output apparatus 2 is between 0% and 80%, the output apparatus 2 uses only an area of the output characteristic indicated by a solid line in the curve line Cm shown in FIG. 6B. Furthermore, as indicated by an arrow in FIG. 6B, the density corresponding to the original gradation value of 100% is reduced from the maximum measured density MD of 1.2 to the maximum target density TD of 1.0. This reducing range becomes larger with increasing absolute value of the difference between the maximum target density TD and the maximum measured density MD. With regard to an image corresponding to when the gradation value of 100% is commanded, void areas in the mesh become conspicuous.

The correcting apparatus 1 provides the first threshold value Th-V indicating the limit at which halftone dots are recognizable by humans. When the maximum measured density MD is higher than or equal to the maximum target density TD and the absolute value of the difference between the maximum measured density MD and the maximum target density TD exceeds the first threshold value Th-V, the correcting apparatus 1 increases the maximum target density TD and updates the target characteristic 121.

For example, assuming that the limit at which halftone dots are recognizable by humans is defined as 5% when solid printing corresponds to 100%, the first threshold value Th-V becomes 0.06 when the maximum measured density MD is 1.2, as shown in FIG. 7. Since the maximum target density TD is 1.0 in this case, the absolute value of the difference between the maximum measured density MD and the maximum target density TD is 0.2, which exceeds the first threshold value Th-V.

Therefore, in this case, the controller 11 of the correcting apparatus 1 proceeds to step S106 and increases the maximum target density TD to 1.14 so as to set the absolute value of the difference between the maximum measured density MD and the maximum target density TD equal to the first threshold value Th-V.

A gradation-value region where the target density is increased in accordance with the increase of the maximum target density TD will now be described. Assuming that the correcting apparatus 1 updates the target characteristic by increasing only the maximum target density TD, a difference between the target density at a gradation value adjacent to the gradation value indicating the maximum target density TD and the increased maximum target density TD becomes high and conspicuous. Therefore, with the increase of the maximum target density TD, the correcting apparatus 1 increases the target density of the gradation value in a predetermined region including the gradation value corresponding to this maximum target density TD.

A second threshold value Gh shown in FIG. 7 indicates the lower limit of the gradation-value region in which the target density is increased in accordance with the increase of the maximum target density TD. Specifically, in a region where the gradation value is higher than the second threshold value Gh, the target density is increased in accordance with the increase of the maximum target density TD. In a region where the gradation value is lower than or equal to the second threshold value Gh, the target density is not changed. Thus, the correcting apparatus 1 updates the target characteristic 121 to a new target characteristic expressed by a line Ct1 shown in FIG. 7. The region where the gradation value is higher than the second threshold value Gh will be referred to as "high density region".

The second threshold value Gh is selected relative to the maximum gradation value of 100% such that a region where it is difficult to visually recognize a change in the density relative to the gradation is formed even when such a change is steep. Therefore, even when the target density is increased in accordance with the increase of the maximum target density TD in the region from the second threshold value Gh to 100%, a change in the density within this region is less conspicuous to the user. For example, in FIG. 7, 90% is defined as the second threshold value Gh. In this case, the target density is increased in accordance with the increase of the maximum target density TD in a region where the gradation value is between 90% and 100%.

The rate at which the target density is increased in a region where the gradation value is higher than the second threshold value Gh may be selected in various ways. For example, on a graph having the gradation value and the density set on orthogonal coordinates, the target density in this region may be increased along a line that connects a point P1, at which the gradation value of the pre-updated target characteristic 121 is equal to the second threshold value Gh as shown in FIG. 7, and a point P2, at which the gradation value is 100% and the density is lower than the maximum measured density MD by the first threshold value Th-V (i.e., by linear interpolation). Furthermore, as an alternative to linear interpolation, the interpolation between the point P1 and the point P2 may be achieved with, for example, a logarithmic function, an exponential function, or other various types of polynomial expressions.

Figure 8:
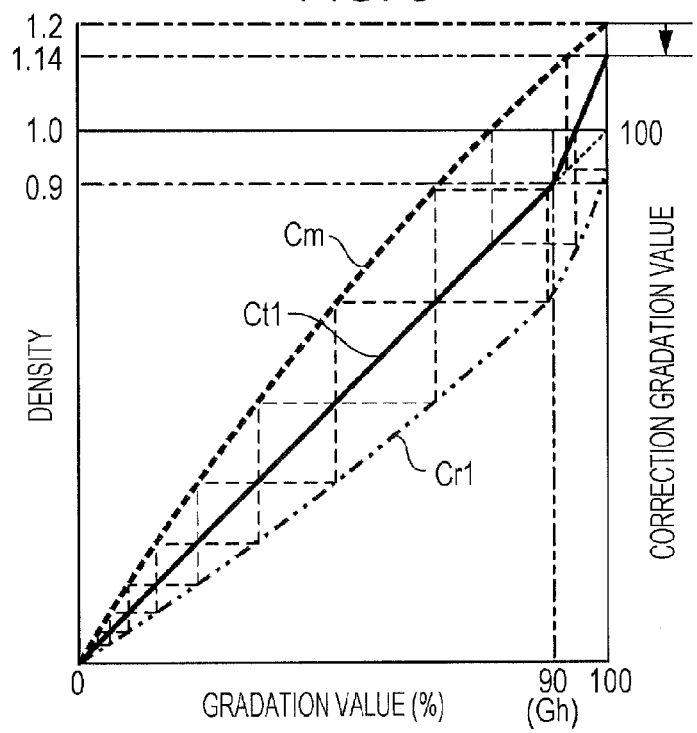
FIG. 8 illustrates a gradation-value correcting process performed using an updated target characteristic.

FIG. 8 illustrates a gradation-value correcting process performed using the updated target characteristic 121. The ordinate axis in FIG. 8 indicates a density in addition to a corrected gradation value. Based on a curve line Cm indicating the output characteristic and a line Ct1 indicating the updated target characteristic 121, a correction characteristic is calculated for correcting the gradation value so as to approximate the output characteristic to this updated target characteristic 121. In FIG. 8, a curve line Cr1 indicates this correction characteristic. With regard to the target characteristic 121, since the target density is increased in accordance with the increase of the maximum target density TD in the region between the second threshold value Gh and 100%, halftone dots are less conspicuous in this region, that is, the high density region. Furthermore, since the increase of the target density in this region is performed while maintaining continuity within the region and is also performed continuously for a region lower than or equal to the second threshold value Gh, a change in the gradation value becomes less conspicuous.

If the controller 11 determines in step S103 that the maximum measured density MD is not higher than or equal to the maximum target density TD (NO in step S103), the controller 11 determines in step S107 whether or not the absolute value of the difference between the maximum measured density MD and the maximum target density TD exceeds a third threshold value Th-W. If the controller 11 determines that the absolute value of the difference between the maximum measured density MD and the maximum target density TD does not exceed the third threshold value Th-W (NO in step S107), the controller 11 maintains the target characteristic 121 in step S105 and ends the process.

If the controller 11 determines that the absolute value of the difference between the maximum measured density MD and the maximum target density TD exceeds the third threshold value Th-W (YES in step S107), the controller 11 updates the target characteristic 121 in step S108 so that the absolute value of the difference between the maximum measured density MD and the maximum target density TD becomes equal to the third threshold value Th-W, and selects a profile to be used for conversion from the color conversion profile group 124 in accordance with the update contents in step S109.

A case where the maximum measured density MD is not higher than or equal to the maximum target density TD and the absolute value of the difference between the maximum measured density MD and the maximum target density TD exceeds the third threshold value Th-W corresponds to a case where the maximum measured density MD (the maximum measured density value) is lower than the maximum target density TD (the maximum target density value) beyond the third threshold value Th-W.

Figure 9A:
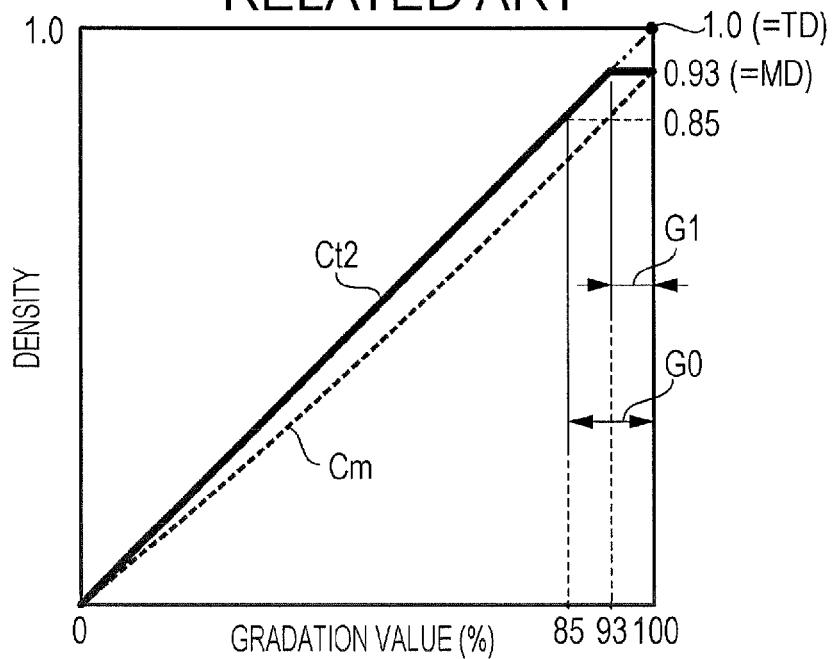
FIGS. 9A and 9B illustrate switchless target characteristics in the related art.
Figure 9B:
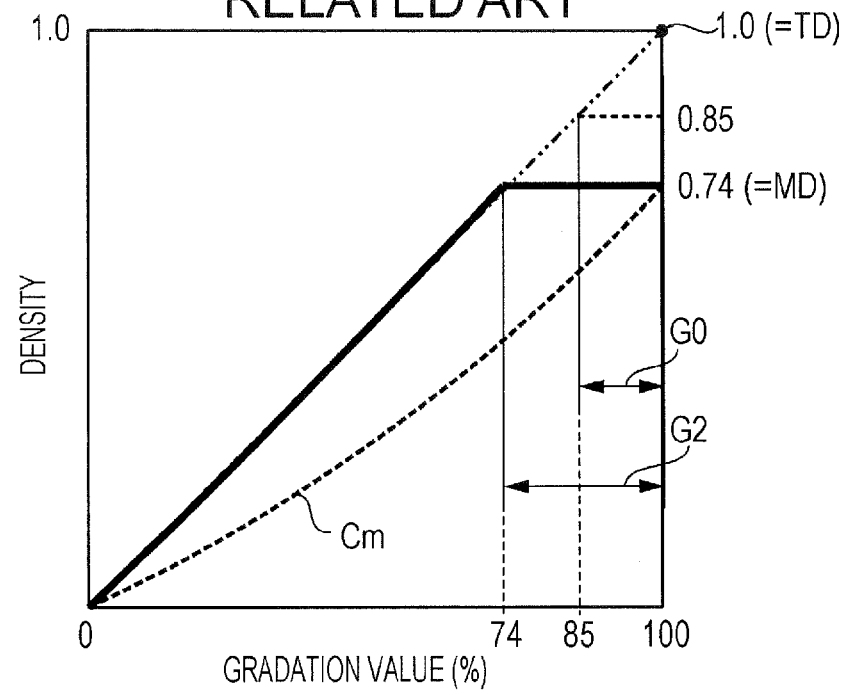
Figure 10:
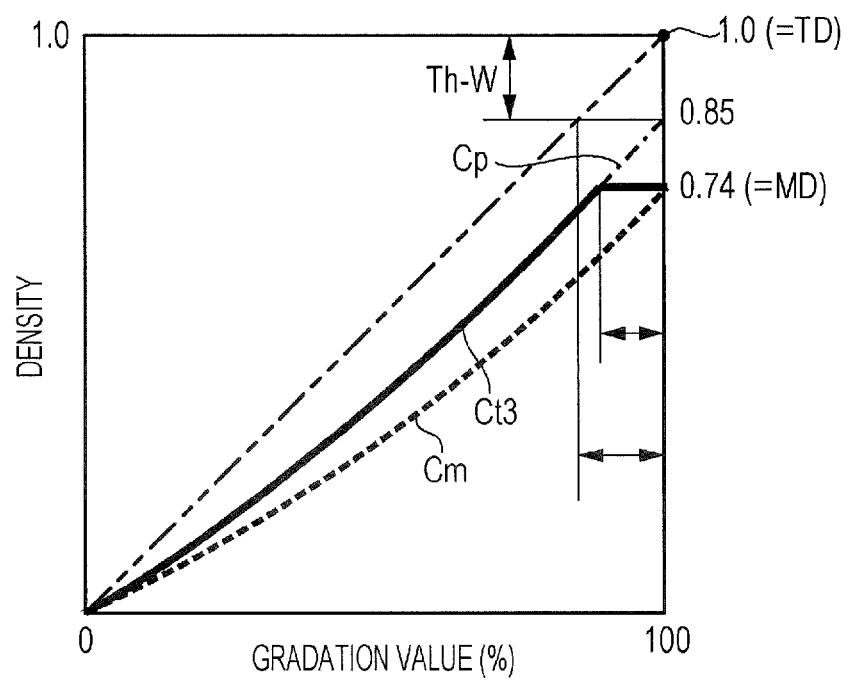
FIG. 10 is a diagram for explaining a third threshold value.

FIGS. 9A and 9B illustrate switchless target characteristics in the related art. FIG. 10 is a diagram for explaining the third threshold value Th-W. In each of FIGS. 9A and 9B and 10, the abscissa axis indicates a gradation value, the ordinate axis indicates a density, and a curve line Cm indicates an output characteristic. Furthermore, a curve line Cp shown in FIG. 10 indicates a target characteristic serving as a predetermined substitute (referred to as "substitute characteristic"). In the substitute characteristic, the maximum density is lower than the maximum target density TD in the target characteristic 121 by the third threshold value Th-W.

The third threshold value Th-W indicates the limit at which so-called gradation loss is recognizable by humans. When the maximum measured density MD is lower than the maximum target density TD, the density of an outputtable image is insufficient. Therefore, when an image is output in accordance with the target characteristic, a region where the density is the same regardless of the fact that gradation values are different occurs at the high-gradation-value side.

For example, in the example shown in FIG. 9A, when any gradation value is commanded in a region G1 of 93% to 100%, the density of an output image is 0.93. This phenomenon is called "gradation loss". When gradation loss occurs, since an image intended to be expressed in the aforementioned region at the high-gradation-value side is not distinguished, the gradation in that region is not distinguished. The wider the non-distinguished gradation region, the more conspicuous the gradation loss becomes to humans. When exceeding a certain threshold value, the gradation loss may cause image disturbance. Specifically, as shown in FIG. 9A, when the region G1 in which gradation loss occurs is smaller than a certain region G0, the gradation loss is less conspicuous to humans even when the gradation is corrected along this target characteristic. However, as shown in FIG. 9B, when gradation loss occurs in a region G2 that exceeds the certain region G0 (in this example, a region of 74% to 100%), the gradation loss often becomes conspicuous.

The correcting apparatus 1 provides the third threshold value Th-W indicating the limit at which gradation loss is recognizable by humans. When the absolute value of the difference between the maximum measured density MD and the maximum target density TD exceeds the third threshold value Th-W, the correcting apparatus 1 performs an updating process of switching the target characteristic 121 to the aforementioned substitute characteristic. Furthermore, the correcting apparatus 1 selects a predetermined profile from the color conversion profile group 124 in accordance with the combination of update statuses of the respective colors.

For example, when the output characteristic indicated by the curve line Cm in FIG. 9A is acquired, the density indicated by a point on the curve line Cm that corresponds to the gradation value of 100%, that is, the maximum measured density MD, is 0.93. Since the maximum target density TD is 1.0, the absolute value of the difference between the maximum measured density MD and the maximum target density TD is 0.07.

In the substitute characteristic indicated by the curve line Cp in FIG. 10, since the maximum target density value is 0.85, the third threshold value Th-W is 0.15. Therefore, in this case, since the absolute value (0.07) of the difference between the maximum measured density MD and the maximum target density TD does not exceed the third threshold value Th-W (0.15), the controller 11 maintains the target characteristic 121, as indicated in step S105 in FIG. 5, and ends the process.

After this process, the actual output characteristic extends along a line Ct2 shown in FIG. 9A. Specifically, this is because, since the upper limit for the density of an image outputtable by the output apparatus 2 is 0.93, the density to be actually output is 0.93 when the gradation value exceeds 93%.

On the other hand, when the output characteristic indicated by the curve line Cm in FIG. 93 is acquired, the maximum measured density MD is 0.74. Since the maximum target density TD is 1.0, the absolute value of the difference between the maximum measured density MD and the maximum target density TD is 0.26.

In the substitute characteristic indicated by the curve line Cp in FIG. 10, the maximum density is 0.85, and the third threshold value Th-W is 0.15. Therefore, in this case, since the absolute value (0.26) of the difference between the maximum measured density MD and the maximum target density TD exceeds the third threshold value Th-W (0.15), the controller 11 updates the target characteristic 121 so that the absolute value of the difference between the maximum measured density MD and the maximum target density TD becomes equal to the third threshold value Th-W, as indicated in step S108 in FIG. 5. The updating process in this case is performed by switching the target characteristic 121 to the substitute characteristic. In other words, the updated target characteristic 121 extends along the curve line Cp in FIG. 10.

As a result of this process, the actual output characteristic extends along a line Ct3 shown in FIG. 10. Specifically, this is because, since the upper limit for the density of an image outputtable by the output apparatus 2 is 0.74, the density to be actually output is 0.74 when the density in the substitute characteristic exceeds a gradation value of 0.74.

Then, in accordance with the updated result of the target characteristic 121 for each of the four colors, the controller 11 of the correcting apparatus 1 selects a profile to be used for color conversion from the color conversion profile group 124, as indicated in step S109.

As described above, the correcting apparatus 1 compares the absolute value of the difference between the maximum measured density in the output characteristic and the maximum target density in the target characteristic with a predetermined value. When the maximum measured density is higher than the maximum target density beyond the first threshold value, the correcting apparatus 1 performs a correcting process of increasing the target density corresponding to the gradation value higher than the second threshold value so as to update the target characteristic 121. Accordingly, with regard to a gradation region lower than or equal to the second threshold value, since the original target characteristic 121 is maintained, the color balance in an intermediate gradation region does not change. As a result, color-tone disturbance in the intermediate gradation region may be suppressed. With regard to a gradation region higher than the second threshold value, since the target density is increased, halftone dots that may cause image disturbance become less conspicuous.

On the other hand, when the maximum measured density is lower than the maximum target density beyond the third threshold value, the target characteristic 121 is updated by being switched to the predetermined substitute characteristic. In addition, a profile to be used for color conversion is selected in accordance with the combination of the update statuses of the respective colors. Thus, when the maximum measured density does not reach the maximum target density, gradation loss in the high gradation region may be suppressed. Furthermore, since a substitute characteristic is set in advance even when the target characteristic of any one of the colors is switched to the substitute characteristic, color conversion is performed by applying a preliminarily-prepared profile in accordance with the combination of switched colors, whereby the effect on the color tone caused by the switching of the target characteristic may be suppressed.

The case where the maximum measured density is higher than the maximum target density beyond the first threshold value and the case where the maximum measured density is lower than the maximum target density beyond the third threshold value both correspond to a case where the difference between the maximum measured density value and the maximum target density value is larger than a predetermined value. In such cases, the correcting apparatus 1 updates the target characteristic by correcting the target density corresponding to the high density region.

2. Modifications

Although the exemplary embodiment has been described above, the contents of this exemplary embodiment may be modified as follows. Moreover, the following modifications may be combined.

2.1. First Modification

In the exemplary embodiment described above, when the maximum measured density MD is higher than or equal to the maximum target density TD, the controller 11 determines whether or not the absolute value of the difference between the maximum measured density MD and the maximum target density TD exceeds the first threshold value Th-V. The threshold value to be compared with this absolute value of the difference may be changed to a threshold value other than the first threshold value Th-V in accordance with the settings of the output apparatus 2.

Figure 11:
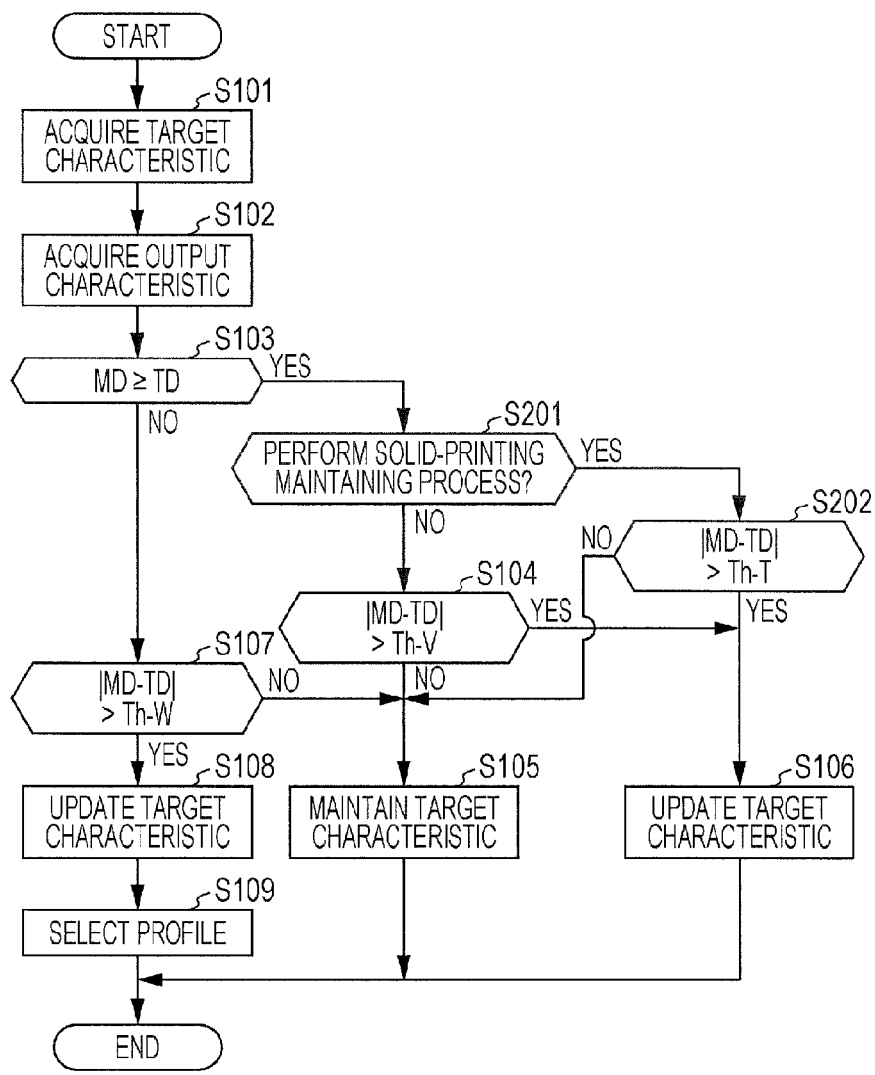
FIG. 11 is a flowchart illustrating the flow of an operation performed by a correcting apparatus according to a modification.

FIG. 11 is a flowchart illustrating the flow of an operation performed by the correcting apparatus 1 in this modification. Of the steps in the flowchart shown in FIG. 11, steps similar to those in the flowchart shown in FIG. 5 will be given the same reference characters, and descriptions thereof will be omitted.

When the maximum measured density MD is higher than or equal to the maximum target density TD (YES in step S103), the controller 11 determines in step S201 whether or not the output apparatus 2 is set to perform a solid-printing maintaining process.

A solid-printing maintaining process is a process performed by the output apparatus 2 for outputting an image with the maximum measured density MD regardless of the gradation value after color conversion if the gradation value before color conversion is 100%. When a gradation value of 100% is converted to a lower value by color conversion, a halftone dot meshing process is sometimes performed. For example, when an image contains text, it may sometimes be difficult to visually recognize the text. The solid-printing maintaining process is a process for avoiding this difficulty and involves specially outputting an image with the maximum density when the gradation value is at maximum at 100%.

However, when a solid-printing maintaining process is performed, an image with the maximum measured density MD is output when the gradation value is 100%. When the gradation value is a value other than 100%, a halftone dot meshing process is performed. Therefore, a difference in densities between pixels corresponding to the gradation value of 100% and pixels corresponding to other gradation values become conspicuous. In particular, in an image in which the gradation value of 100% and the vicinity thereof are expressed with gradation, so-called tone jump in which a density difference is conspicuous may occur.

The correcting apparatus 1 provides a fourth threshold value Th-T that indicates the limit at which tone jump is recognizable by humans. When the absolute value of the difference between the maximum measured density MD and the maximum target density TD exceeds the fourth threshold value Th-T, the correcting apparatus 1 increases the maximum target density TD and updates the target characteristic 121.

If it is determined that the output apparatus 2 is not set to perform the solid-printing maintaining process (NO in step S201), the controller 11 proceeds to step S104 shown in FIG. 5.

On the other hand, if it is determined that the output apparatus 2 is set to perform the solid-printing maintaining process (YES in step S201), the controller 11 determines whether or not the absolute value of the difference between the maximum measured density MD and the maximum target density TD exceeds the fourth threshold value Th-T in step S202. This fourth threshold value Th-T indicates the limit at which tone jump in a high density image is recognizable by humans.

If it is determined that the absolute value of the difference between the maximum measured density MD and the maximum target density TD does not exceed the fourth threshold value Th-T (NO in step S202), the controller 11 proceeds to step S105 shown in FIG. 5 and ends the process while maintaining the target characteristic 121.

On the other hand, if it is determined that the absolute value of the difference between the maximum measured density MD and the maximum target density TD exceeds the fourth threshold value Th-T (YES in step S202), the controller 11 updates the target characteristic 121 in step S106 so that the absolute value of the difference between the maximum measured density MD and the maximum target density TD becomes equal to the fourth threshold value Th-T.

The updating process of the target characteristic 121 involves increasing the maximum target density TD such that the maximum measured density MD becomes higher than the maximum target density TD by the fourth threshold value Th-T, and increasing the corresponding target density for a gradation value higher than the second threshold value Gh.

Specifically, the output apparatus 2 is set so as to output an image with the maximum measured density value relative to the maximum gradation value when the maximum measured density MD (maximum measured density value) is higher than or equal to the maximum target density TD (maximum target density value). Moreover, when the maximum measured density value is higher than the maximum target density value beyond the fourth threshold value indicating the limit at which tone jump is recognizable, the controller 11 of the correcting apparatus 1 updates the target characteristic 121 by increasing the target density corresponding to a gradation value higher than the second threshold value so that the maximum measured density value becomes higher than the maximum target density value by the fourth threshold value.

Figure 12A:
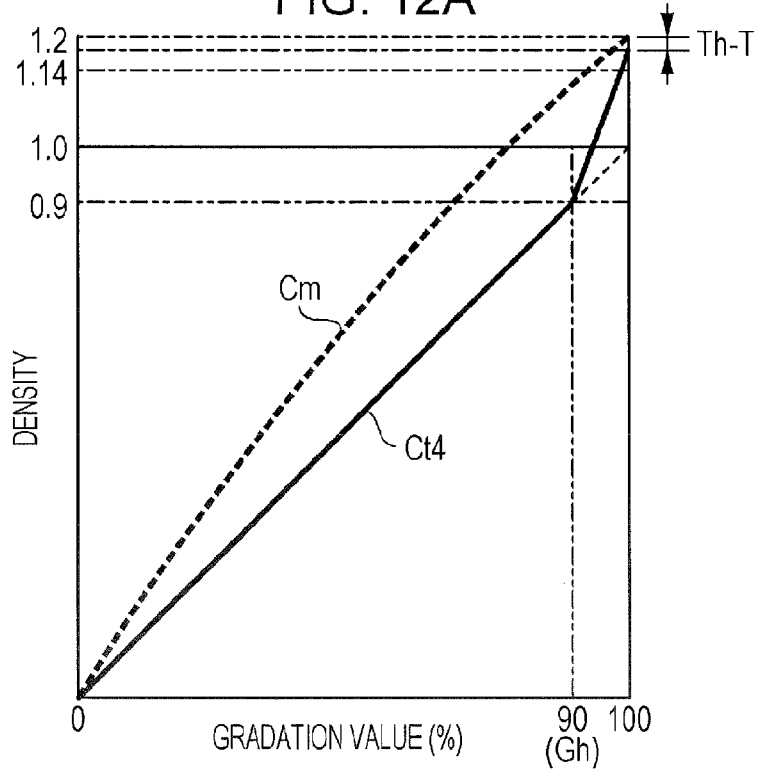
FIGS. 12A and 12B are diagrams for explaining a fourth threshold value.
Figure 12B:
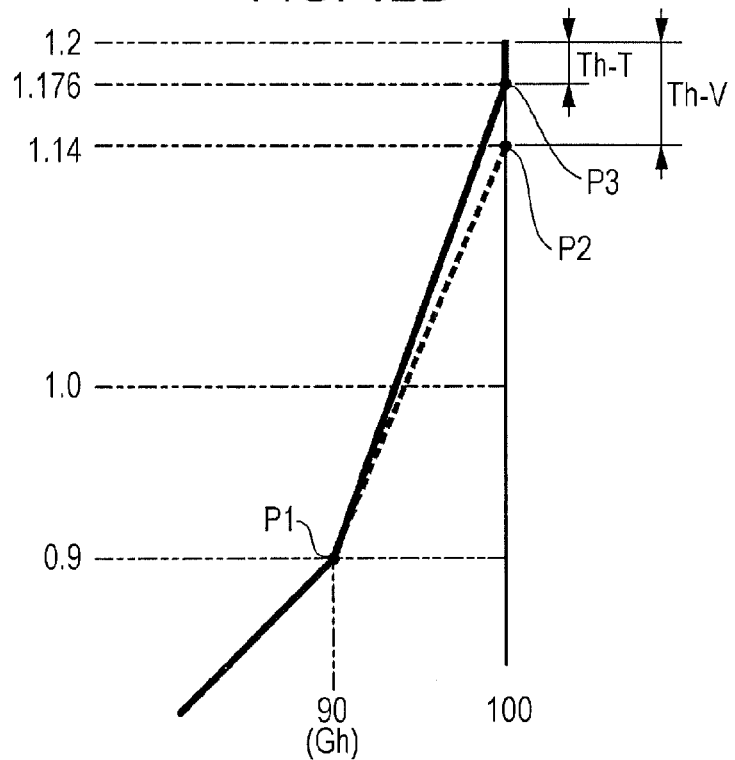

FIGS. 12A and 12B are diagrams for explaining the fourth threshold value Th-T. In each of FIGS. 12A and 12B, the abscissa axis indicates a gradation value, whereas the ordinate axis indicates a density. A curve line Cm in FIG. 12A indicates the output characteristic acquired by the operable unit 13 and the controller 11 from the measuring device 3, and the density corresponding to the gradation value of 100% is the maximum measured density MD of 1.2. The following description relates to a case where the maximum target density TD is 1.0 and the maximum measured density MD is 1.2.

FIG. 12B illustrates an enlarged view of a region where the gradation value is and near 100% in a graph shown in FIG. 12A. The output apparatus 2 expresses gradation ranging between 0 and 1.2 by halftone dot meshing. If the output apparatus 2 is set to perform the solid-printing maintaining process, the output apparatus 2 outputs an image solid-printed with a density of 1.2, which is the maximum measured density MD relative to the gradation value of 100%. Therefore, with regard to pixels whose gradation value is not 100%, the density difference thereof relative to pixels with a gradation value of 100% becomes conspicuous as the gradation value becomes closer to 100%. In order to avoid such tone jump in which this density difference is conspicuous, the controller 11 increases the maximum target density TD to a value lower than the maximum measured density MD by the fourth threshold value Th-T. Thus, the maximum measured density MD becomes higher than the maximum target density TD by the fourth threshold value Th-T. Moreover, the target density is increased also for a region where the gradation value is higher than the second threshold value Gh.

For example, assuming that the limit at which tone jump is recognizable by humans is defined at 2% when solid printing is defined at 100%, when the maximum measured density MD is 1.2 as shown in FIG. 12B, the fourth threshold value Th-T is 0.024. In this case, since the maximum target density TD is 1.0, the absolute value of the difference between the maximum measured density MD and the maximum target density TD is 0.2, which exceeds the fourth threshold value Th-T.

Therefore, in this case, the controller 11 of the correcting apparatus 1 proceeds to step S106 and increases the maximum target density TD to 1.176 so as to set the absolute value of the difference between the maximum measured density MD and the maximum target density TD equal to the fourth threshold value Th-T (0.024).

The rate at which the target density is increased in the region where the gradation value is higher than the second threshold value Gh may be selected in various ways. For example, on a graph with the gradation value and the density set on orthogonal coordinates, the target density in this region may be increased along a line that connects a point P1, at which the gradation value of the pre-updated target characteristic 121 is equal to the second threshold value Gh as shown in FIG. 12B, and a point P3, at which the gradation value is 100% and the density is lower than the maximum measured density MD by the fourth threshold value Th-T (i.e., by linear interpolation). Furthermore, as an alternative to linear interpolation, the interpolation between the point P1 and the point P3 may be achieved with, for example, a logarithmic function, or other various types of polynomial expressions.

Although the first threshold value Th-V indicates the limit at which halftone dots become inconspicuous to humans, since a region where tone jump becomes inconspicuous is generally smaller than a region where halftone dots become inconspicuous, if two pixels having a density difference of the first threshold value Th-V are adjacent to each other when a solid-printing maintaining process is performed, there may be a case where tone jump is recognizable. In this modification, when the output apparatus 2 performs the solid-printing maintaining process, the correcting apparatus 1 updates the target characteristic 121 by increasing the maximum target density TD to a value smaller than the maximum measured density MD by the fourth threshold value Th-T, so that tone jump that may cause image disturbance may become less conspicuous.

2.2. Second Modification

In the image forming system 9 shown in FIG. 1, the correcting apparatus 1 is accommodated inside the output apparatus 2. Alternatively, the correcting apparatus 1 may be not accommodated inside the output apparatus 2. For example, the correcting apparatus 1 may be a terminal, such as a portable telephone or a slate-type computer, wirelessly connected to the output apparatus 2.

2.3. Third Modification

In a case where the target density is defined as y and the gradation value is defined as x (%), for example, the target characteristic 121 may be expressed with the following combination of functions, as shown in Expression (1) below.

$$y=ax+c(x:0\leq x\leq Gh)$$

$$y=bx+d(x:Gh<x\leq 100)$$

$$(a\neq b, a\times Gh+c=b\times Gh+d) \quad (1)$$

2.4. Fourth Modification

Although a single substitute characteristic is set in advance in the above description, multiple substitute characteristics may be set. In this case, for example, a substitute characteristic to be switched with the target characteristic may be selected from the multiple substitute characteristics starting preferentially from those with a smaller difference between the maximum target density TD included in each substitute characteristic and the maximum measured density MD indicated by the output characteristic.

2.5. Fifth Modification

The program to be executed by the controller 11 of the correcting apparatus 1 may be provided by being stored in a computer-readable storage medium, which includes a magnetic storage medium, such as a magnetic tape or a magnetic disk; an optical storage medium, such as an optical disk; a magneto-optical storage medium; and a semiconductor memory. Furthermore, this program may be downloaded via a network, such as the Internet. As a controller exemplified by the controller 11 described above, various types of devices other than a CPU may be applied. For example, a dedicated processor may be used.

The foregoing description of the exemplary embodiment of the present invention has been provided for the purposes of illustration and description. It is not intended to be exhaustive or to limit the invention to the precise forms disclosed. Obviously, many modifications and variations will be apparent to practitioners skilled in the art. The embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A correcting apparatus comprising:
  a controller configured to act as:
    a first acquiring unit that acquires a target characteristic expressing a correspondence relationship between a gradation value and a target density of an image to be output from an output apparatus in accordance with the gradation value;
    a second acquiring unit that acquires an output characteristic expressing a correspondence relationship between a gradation value and a measured density of the image output from the output apparatus in accordance with the gradation value;
    an updating unit that updates the target characteristic by correcting the target density corresponding to a high density region including a maximum value of the target density when a difference between a maximum value of the measured density and the maximum value of the target density is larger than a predetermined value; and
    a correcting unit that corrects the gradation value so as to approximate the output characteristic acquired by the second acquiring unit to the target characteristic updated by the updating unit,
  wherein when the maximum value of the measured density is higher than the maximum value of the target density beyond a first threshold value, the updating unit updates the target characteristic by increasing the target density corresponding to the high density region in which the gradation value is higher than a second threshold value, so that the maximum value of the measured density becomes higher than the maximum value of the target density by the first threshold value.

2. The correcting apparatus according to claim 1, wherein the first threshold value indicates a limit at which a halftone dot is recognizable.

3. An output apparatus that receives a gradation value corrected by the correcting apparatus according to claim 1 and outputs an image.

4. A correcting apparatus comprising:
  a controller configured to act as:
    a first acquiring unit that acquires a target characteristic expressing a correspondence relationship between a gradation value and a target density of an image to be output from an output apparatus in accordance with the gradation value;
    a second acquiring unit that acquires an output characteristic expressing a correspondence relationship between a gradation value and a measured density of the image output from the output apparatus in accordance with the gradation value;
    an updating unit that updates the target characteristic by correcting the target density corresponding to a high density region including a maximum value of the target density when a difference between a maximum value of the measured density and the maximum value of the target density is larger than a predetermined value; and
    a correcting unit that corrects the gradation value so as to approximate the output characteristic acquired by the second acquiring unit to the target characteristic updated by the updating unit,
  wherein when the maximum value of the measured density is lower than the maximum value of the target density beyond a third threshold value, the updating unit performs an updating process by switching the target characteristic to a substitute characteristic in which the maximum value of the target density is lower by the third threshold value, and selects a color conversion profile to be used by the output apparatus when converting gradation values of a plurality of color components of pixels for reproducing colors of the pixels in accordance with update contents of the target characteristic for each of the color components.

5. The correcting apparatus according to claim 4, wherein the third threshold value indicates a limit at which gradation loss is recognizable.

6. A correcting apparatus comprising:
  a controller configured to act as:
    a first acquiring unit that acquires a target characteristic expressing a correspondence relationship between a gradation value and a target density of an image to be output from an output apparatus in accordance with the gradation value;
    a second acquiring unit that acquires an output characteristic expressing a correspondence relationship between a gradation value and a measured density of the image output from the output apparatus in accordance with the gradation value;
    an updating unit that updates the target characteristic by correcting the target density corresponding to a high density region including a maximum value of the target density when a difference between a maximum value of the measured density and the maximum value of the target density is larger than a predetermined value; and
    a correcting unit that corrects the gradation value so as to approximate the output characteristic acquired by the second acquiring unit to the target characteristic updated by the updating unit, wherein when the output apparatus is set to output the image in accordance with the maximum value of the measured density relative to a maximum gradation value, and the maximum value of the measured density is higher than the maximum value of the target density beyond a fourth threshold value indicating a limit at which tone jump is recognizable, the updating unit updates the target characteristic by increasing the target density corresponding to the high density region in which the gradation value is higher than the second threshold value, so that the maximum value of the measured density becomes higher than the maximum value of the target density by the fourth threshold value.

* * * * *